United States Patent [19]

Comby et al.

[11] 4,280,075

[45] Jul. 21, 1981

[54] DEVICE FOR DETECTING AND LOCATING RADIATIONS, AND IN PARTICULAR ELECTRON RELEASING PHENOMEA

[75] Inventors: Georges Comby, Rambouillet; Philippe Mangeot, Paris, both of France

[73] Assignee: Commissariat a l'Energie Atomique, Paris, France

[21] Appl. No.: 55,750

[22] Filed: Jul. 6, 1979

[30] Foreign Application Priority Data

Jul. 12, 1978 [FR] France ............................... 78 20807

[51] Int. Cl.[3] ......................... G01T 1/185; H01J 47/08

[52] U.S. Cl. ...................................... 313/93; 250/385; 313/309

[58] Field of Search .................... 313/93, 309; 250/385

[56] References Cited

U.S. PATENT DOCUMENTS

| | | | |
|---|---|---|---|
| 3,383,538 | 5/1968 | Bowyer | 313/93 X |
| 3,418,474 | 12/1968 | Spergel et al. | 313/93 X |
| 3,676,682 | 7/1972 | Falk | 313/93 X |
| 3,975,638 | 8/1976 | Grunberg et al. | 313/93 X |

*Primary Examiner*—Palmer C. Demeo
*Attorney, Agent, or Firm*—Haseltine and Lake

[57] ABSTRACT

A device for detecting and locating radiations, comprising at least one cathode brought to a first potential with respect to a reference potential in a sealed enclosure, a plurality of threadlike anodes insulated from one another and photosensitive means, said enclosure being provided with a port-hole transparent to the radiations involved, situated in register with said cathode and anodes, said device further comprising an insulating support with two faces, a portion of one of said two faces, situated in register with said port-hole, being coated with a layer of a conductive material forming a mesh network constituting said cathode, the extremities of said anodes being in the shape of a point and the axes of said anodes respectively coinciding with the axes of the meshes of said network, these points being recessed with respect to the insulating support face, coated with the network conductive meshes.

8 Claims, 4 Drawing Figures

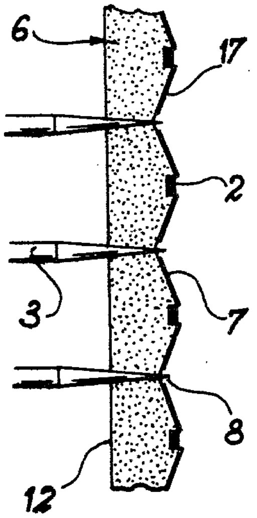
FIG. 2
FIG. 3
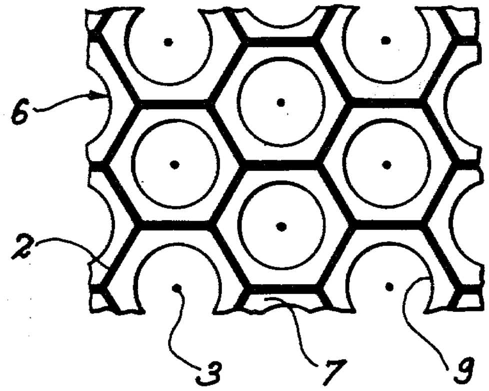
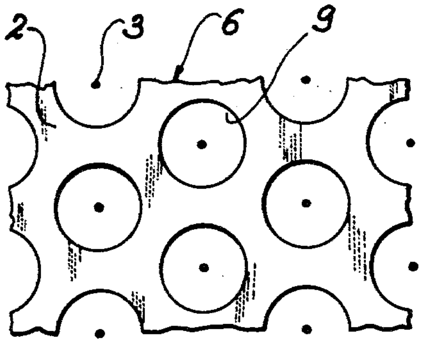
FIG. 4

DEVICE FOR DETECTING AND LOCATING RADIATIONS, AND IN PARTICULAR ELECTRON RELEASING PHENOMEA

The present invention relates to a device for detecting and locating radiations and, in particular, for detecting and locating electron releasing phenomena.

It applies more especially to the detection of photons issuing from UV and visible radiations. It also permits the representation of physical phenomena simultaneously generating a large number of photons.

It is known that, for detecting photons, it is necessary to carry out two operations in succession, viz. a first operation consisting in converting every photon into one or several electrons, and a second operation consisting in multiplying said electrons, with a view to obtaining a measurable electric signal.

In cases where the conversion of a photon provides but one electron, the detection is rather difficult. This is, for instance, the case with photons endowed with an energy lower than 12.3 eV corresponding to a light, the wavelength of which is above 1000 Å. If, in addition to the photon detection, it is required to locate the photon conversion place on the detector, it is of major importance that said conversion permit to obtain an electric signal with a sufficient amplitude, corresponding to said single electron.

Vacuum or gas-filled photocells, photoconductive or photovoltaic cells and photomultipliers permit to measure light fluxes. In particular, photomultipliers are endowed with high sensitivity and permit to measure very weak light fluxes and to detect and locate a single photoelectron. However, they require an elaborate manufacture and, hence, they are very costly. Their quantic efficiency, of the order of 10%, is linked to the photocathode efficiency. In spite of the existence of micro-channels, photomultipliers remain bulky and cumbersome, although the use of microchannels permits to decrease their length considerably. Their multiplication factor is from about $10^5$ to $10^6$ and their dark current is about $10^{-7}$ A. Moreover, the positive ions issuing from residual gases contained in said photomultipliers induce a gradual destruction of the photocathode. Finally, the spectrum of the pulses corresponding to a single photoelectron cannot be easily distinguished from the photocathode thermo-ionic noise pulses. When conversion provides but one electron, it is very difficult to detect and locate the radiation, since the probability to lose said single electron is very high. This is in particular the case with all photons, the energy of which is lower than 12.3 eV, having a wavelength above 1,000 Å. The detection can be efficient and exploited only if there is a large electronic muliplication, generating a signal that clearly distinguishes from the background noise. If, in addition, it is desired to locate the photoelectron conversion place, it is then necessary to associate the photomultiplier to a detectable multiplying zone resting, e.g., on the principle of a proximity focusing, or on the use of electrostatic lenses.

For detecting a single photoelectron, the only device known to this day is a photomultiplier of the "Quantacon" type, in which the pulse spectrum is clearly distinguished from the thermoelectronic noise. Such a photomultiplier, however, and also the microchannel photomultipliers require a very elaborate manufacture and, hence, are very costly. Such a photomultiplier has a reduced quantic efficiency, of about 10% linked to the photocathode efficiency; in addition, it is rather cumbersome.

One object of the invention is to obviate these drawbacks and, in particular, to provide a radiation dectection and location device in which it is possible to detect and locate a single photon, either by photoelectric effect on photosensitive deposit, or by photoionisation of a gas mixture and, in some cases, by both ways at the same time. Another object object of the present invention is to permit the electrostatic focusing of the photoelectrons on detectable multiplying zones, thus ensuring the determination of the conversion place. The multiplying zone has a high gain and thus makes it possible to obtain pulses, the large amplitude of which permits to distinguish then easily from the background noise of the electronic installation. The design of the device according to the invention in such that the elements thereof can be repaired in case of defective operation.

More specifically, the present invention relates to a device for detecting and locating radiations, comprising at least one cathode brought to a first potential with respect to a reference potential in a sealed enclosure, a pluraltiy of threadlike anodes insulated from one another and photosensitive means, said enclosure being provided with a port-hole transparent to the radiation involved, situated in register with said cathode and anodes, said device further comprising an insulating support with two faces, a portion of one of said two faces, situated in register with said port-hole, being coated with a layer of a conductive material forming a mesh network constituting said cathode, the extremities of said anodes being in the shape of a point and the axes of said anodes respectively coinciding with the axes of the meshes of said network, these points being recessed with respect to the insulating support face, so as to provide the photon insulation of each of said anodes. Said insulating support face is coated with the network of conductive meshes.

According to another feature of the invention, the inner face of said port-hole is coated with a web of a conductive material, brought to a second potential with respect to a reference potential.

Preferably, said photosensitive means are constituted by a network of photosensitive material, of the same shape as the network forming the cathode and deposited in several layers on said network.

Conveniently, said photosensitive means are constituted by at least one photoionisable gas circulating within said enclosure.

According to a further feature, the device according to the invention also comprises means for detecting and locating the anodes with a potential difference with respect to the reference potential.

According to a still further feature, the other face of said insulating support is coated with a further network of meshes of a conductive material, parallel with the meshes of the network forming the cathode, said further network being brought to a third potential with respect to said reference potential.

Finally, said support is preferably pierced with holes corresponding to the meshes of said network forming the cathodes.

Other features of the present invention will appear from the following description, given merely by way of example, with respect to the accompanying drawing, in which:

FIG. 2 shows, in cross section, another embodiment of the device according to the invention, in which the shape of the cathode support is different from that shown in FIG. 1;

FIG. 3 is a view from above of a cathode support, said cathode forming a network with a so-called "honey comb" web;

FIG. 4 is a view from above of said cathode support, said cathode being constituted by a conductive layer deposited on the surface of said insulating support provided with holes, in register with the anodes.

Figure 1:
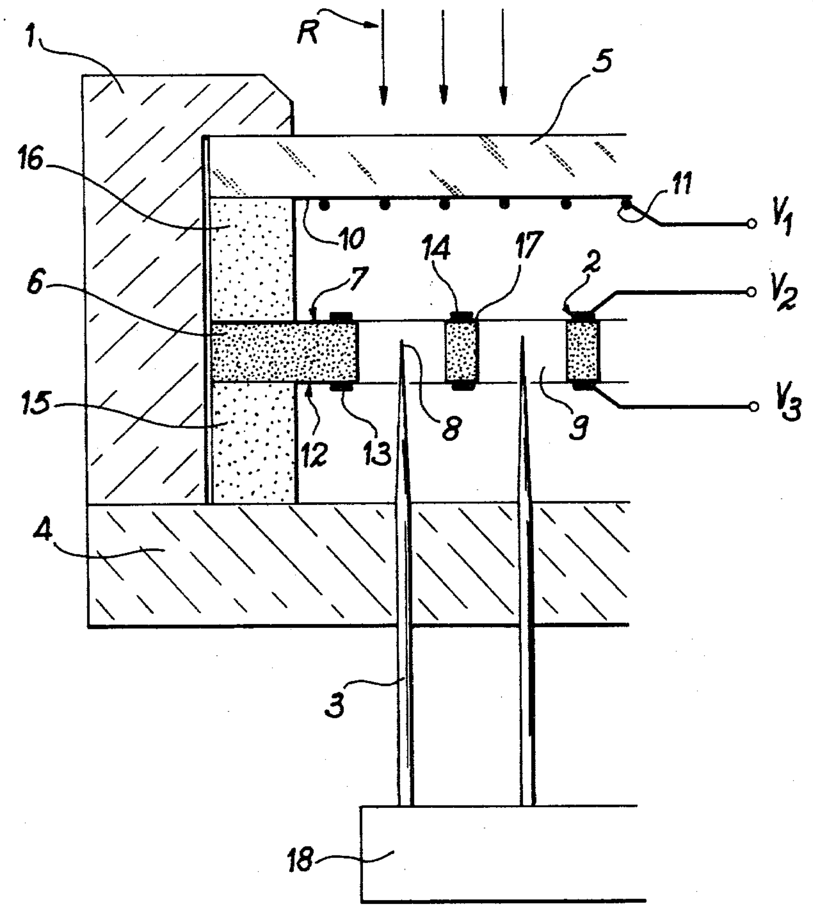
FIG. 1 is a partial section of the device according to the invention.

The device for detecting and locating radiations such as shown in FIG. 1 and constituting a first possible embodiment of the invention, comprises, in a tight enclosure 1, at least one cathode such as 2 brought to a first potential $V_2$ with respect to a reference potential, and a plurality of threadlike anodes 3, insulated from one another by means of an insulating part 4. Said device also comprises photosensitive means to be described hereinafter in more details. Tight enclosure 1 is provided with a transparent port-hole 5 situated in register with cathode 2 and anodes 3. Cathode 2 is constituted by a layer 14 of a conductive material forming a network of meshes; said layer is deposited on an insulating support 6, on face 7 of the support in register with insulating port-hole 5. Anodes 3 are threadlike and the extremities 8 thereof have the shape of points. The axes of said anodes respectively coincident with the axes of the meshes of said network forming the cathode. Points 8 of said anodes are recessed with respect to face 7 of insulating support 6. In the embodiment of the device according to the invention are provided photosensitive means constituted by a photoionisable gas mixture circulating within the enclosure. The means allowing such a circulation of said gas or of said gas mixture are not shown in this figure. In the embodiment of the device such as shown in the figure, insulating support 6 is pierced with holes 9 respectively corresponding to the meshes of the network forming the cathode. As explained hereinafter in more detail, said insulating support can be devoid of holes corresponding to the meshes of the network forming said cathode. The gas or gas mixture contained in enclosure 1 provides a high, stable electronic multiplication in the electric field area, in the vicinity of the anode points. In this first embodiment of the device according to the invention, the conversion of photoelectrons is achieved by photoionisation of the gas or of one of the components of the gas mixture, or else by a photoelectric effect of the photosensitive deposit, introduced into enclosure 1.

According to another embodiment of the device according to the invention, the inner face 10 of the insulating port:hole 5 may be coated with a web of a conductive material brought to a second potential $V_1$ with respect to the reference potential. Said web can be deposited in the form of a thin layer on the port-hole inner surface or can be constituted by a grid or a lattice of very small diameter wires. According to said another embodiment of the device according to the invention, a gas or a gas mixture circulates within enclosure 1, so that the electronic multiplicaton is achieved in the electric field area, in the vicinity of the anode points. The conversion of photoelectrons is obtained by photoionisation of the gases or of the gas mixture contained in said enclosure. Conductive web 11, situated on the inner surface 10 of port-hole 5 is brought to a potential $V_1$ and permits to obtain an efficient draining of the photoelectrons in the electric field area in the vicinity of the anodes, with a better efficiency.

According to another embodiment of the device according to the invention, the other face (12) of insulating support 6 can be coated with another network of meshes 13, of conductive material; these meshes are parallel with those of the network forming the cathode; they are brought to a third potential $V_3$, with respect to the reference potential. Quite obviously, as in the case of the network of meshes forming the cathode, said network can be deposited on face 12, as a thin layer. Said network can also be constituted by insulated wires adapted to collect information signals concerning the location of those radiations reaching the port-hole. Quite obviously again, as in the previously described embodiment, a gas or a gas mixture circulates within tight enclosure 1 and the photoelectronic conversion is achieved by photoionisation of said gas or gas mixture circulating within said enclosure.

According to a further embodiment of the device according to the invention, tight enclosure 1 does not contain any photoionisable gas or gas mixture, but the photosensitive means are then constituted by a deposit 17 of a photosensitive material on face 7 of insulating support 6, for instance as a thin layer. In this case, radiation R acts on photosensitive deposit 17, thus releasing electrons. The latter are drained by the lines of force of the electric field connecting cathode network 2 to the anode, or anodes where avalances occur. It is quite obvious that, in the other embodiment of the device according to the invention in which a photosensitive deposit covers the cathode network, a structure in compliance with the above described various embodiments might be contemplated. Indeed, as in the previous case a network of a conductive material 13 may cover the other face (12) of insulating support 6; in the same way, it is possible to contemplate a network or a conductive web 11 covering the inner face of transparent port-hole 5. In addition, in this embodiment, it is quite obvious that said enclosure is filled with a gas or a gas mixture; under such conditions, the photoelectronic conversion is carried out simultaneously through a photoelectric effect due to photosensitive layer 14 and through photoionisation in the gas or the gas mixture circulating within said enclosure 1. The photosensitive means are therefore of two types and it follows that the photoelectric conversion can be simultaneously carried out through the above mentioned two effects, which permits to detect and locate two radiations of different wavelengths. It is quite obvious that when the network of cathodes is covered by photosensitive deposit, said cathodes form an electrode distinct from the photosensitive deposit, even if the latter has the same support.

In the figure, are also shown shims 15, 16 adapted to maintain insulating support 6 between the anode support 4 and transparent port-hole 5 within partition 17 of enclosure 1.

In the case of those embodiments of the device according to the invention comprising the introduction of a gas or a gas mixture within tight enclosure 1, electronic multiplication is carried out according to the Geiger regime, or the like, in the electric field of at least one anode point. The mixture circulates through the body of said device with the help of means not shown in the figure, at a pressure suitable for a stable operation of said device. It is to be noted that the various parts of said device, and, in particular, the anodes and their supports, the network of cathodes and its support, can be in one piece or arranged according to a pattern of discrete elements permitting to obtain detectors of large sizes and of various shapes, e.g. of spherical shape, which renders it easier to adapt the detector to various radiation sources and also permits an easy maintenance of said detector. The device thickness is reduced and the device can be used in stacks. Said device permits to detect and locate various kinds of nuclear radiations generating a larger number of primary electrons. Since the anodes are independent from one another, said device permits to record a large number of events per second. In addition, it can be associated to converters of various types, such as gamma radiation converters, neutron converters. Finally, the figure also shows means 18 permitting to detect and locate those anodes for which there is a potential difference with respect to the reference potential. Indeed, the combination of said anodes has a function similar to that of the microchannel wafers in a photomultiplier. These anodes permit to obtain a substantial multiplication of the number of electrons, thus providing a readily measurable signal. The means 18 permitting to detect and locate those anodes having a potential difference with respect to the reference potential are well known in the prior art and have not been shown in detail. Said means are usually constituted by a logic circuit permitting to detect the anode or anodes having a potential difference with respect to said reference potential; these means also comprise means for measuring said potential difference.

In FIG. 2, is shown, in cross section, another embodiment of insulating support 6 and cathodes 2. Contrary to the previous embodiment, this support is not provided with holes and it supports the points 8 of anodes 3. As in the previous embodiment, these points of the anodes are recessed with respect to the level of the cathodes. Quite obviously, as in the previous cases, face 12 of support 6 could, if necessary, comprise a network of conductive meshes in register with the network of meshes forming cathodes 2, carried by face 7 of support 6. It is also quite obvious that face 7 of support 6 is also coated with a photosensitive layer 14.

In FIG. 3 is shown, seen from above, face 7 of the insulating support 6 on which has been deposited a network 2 of conductive meshes forming the cathode. Said network, in this particular embodiment, is of the honeycomb type and it is assumed that anodes 3 are centrally mounted in holes 9 pierced through insulating support 6.

FIG. 4 shows insulating support 6, as seen from above. In this particular embodiment, the cathode is constituted by a conductive layer 2, deposited on insulating support 6; anodes 3 are centrally situated in holes 9 of insulating support 6.

Quite obviously, in the above description made with reference to FIGS. 3 and 4, the cathode might be covered with a photosensitive layer and the opposite face of insulating support 6 (not shown in these figures) might be covered with conductive layers forming a network similar to the one that is shown.

In the above described device, in view of the arrangment of the anodes and of the fact that they are independent from one another, quite a number of electronic geometric compositions can be obtained very easily, with a view to selecting configurations of events in space and in time.

Of course, changes could be made in the above description without going beyond the scope of the invention.

What is claimed is:

1. A device for detecting and locating radiations, comprising at least one cathode brought to a first potential with respect to a reference potential in a sealed enclosure, a plurality of threadlike anodes insulated from one another and photosensitive means, said enclosure being provided with a port-hole transparent to the radiation involved, situated in register with said cathode and anodes, said device further comprising an insulating support with two faces, a portion of one of said two faces, situated in register with said port-hole, being coated with a layer of a conductive material forming a mesh network constituting said cathode, the extremities of said anodes being in the shape of a point and the axes of said anodes respectively coinciding with the axes of the meshes of said network, these points being recessed with respect to the insulating support face, coated with the network of conductive meshes.

2. A device according to claim 1, wherein theinner face of said port-hole is coated with a web of a conductive material brought to a second potential with respect to the reference potential.

3. A device according to claim 2, wherein said photosensitive means are constituted by a deposit of a photosensitive material deposited on the upper face of said insulating support.

4. A device according to claim 3, wherein said photosensitive means further comprise at least one photoionisable gas circulating inside said enclosure.

5. A device according to claim 2, wherein said photosensitive means are constituted by at least one photoionisable gas circulating inside said enclosure.

6. A device according to any of claims 3 to 5, wherein further comprising means for detecting and locating the anodes, having a potential difference with respect to said reference potential.

7. A device according to claims 6, wherein said other face of the insulating support is coated with a further network of meshes of a conductive material, parallel with the meshes of the network forming the cathode, said further network being brought to a third potential with respect to said reference potential.

8. A device according to claim 7, wherein said insulating support is pierced with holes corresponding to the meshes of the network forming said cathode.

* * * * *